United States Patent Office 2,907,735
Patented Oct. 6, 1959

2,907,735

ESTERIFIED EPOXY POLYESTERS

Sylvan O. Greenlee, Racine, Wis., assignor to S. C. Johnson & Son, Inc., Racine, Wis.

No Drawing. Application June 30, 1955
Serial No. 519,275

10 Claims. (Cl. 260—22)

This invention relates to new epoxy polyester adducts. More particularly, this invention is concerned with novel esters obtained by esterifying an epoxidized polyester resin with an unsaturated diester acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention provides a means of not only chemically combining such acids with a particular resin, but because of the form in which the acids are used, facilitates the preparation of materials containing a very high proportion of the desired plasticizing or drying residues.

The reaction products which constitute the essence of this invention are prepared by partially or completely esterifying an epoxidized polyester of tetrahydrophthalic acid and a glycol with an unsaturated diester acid. By partial esterification it is meant that only 1 mol of the diester acid is employed per epoxide equivalent weight of the epoxy polyester. By using these proportions so that one equivalent of the acid reacts with 1 equivalent of the epoxide, the esterification involves direct splitting of the epoxide group by addition, resulting in one unreacted hydroxyl group for each ester group formed. This reaction may be illustrated as follows:

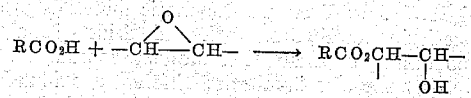

Since this type of reaction involves reaction of the carboxyl group with the epoxide group only, it may be carried out at relatively low temperatures and/or during relatively short periods of time as compared to the temperature and time required for esterification of alcoholic hydroxyl groups. This is of particular advantage in cases where it is desired to carry out the esterification during a normal film curing baking process. For example, it is convenient to formulate a heat-converting varnish by dissolving a mixture of the diester acids with the epoxidized polyester resins in an organic solvent, applying thin films of this mixture, and submitting the films to a normal film-converting treatment, such as 1 hour at 175° C. Heat treatment with this type of formulation is sufficient to bring about the esterification of the diester acids with the epoxide groups through direct addition reactions as illustrated by the above reaction, and at the same time, cause olefin polymerization through the double bonds present in the unsaturated portions of the diester acids. It is often desirable to add small amounts of varnish driers, such as a cobalt drier, to this mixture of diester acids and epoxy resins before the heat treatment in order to catalyze the olefin polymerization.

For other applications, it may be desirable to use more completely esterified products in which case the diester acids are used in quantities approaching that equivalent to the available esterifiable epoxide and hydroxyl groups of the epoxidized polyester resin. In this case the quantity of diester acid used would approach 2 mols of the diester acid per epoxide equivalent weight since the hydroxyl group liberated by the epoxide addition reaction is esterifiable with a mol of the diester acid. This reaction may be illustrated generally by the following:

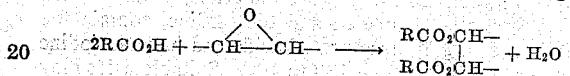

The materials contemplated for use in preparing the subject esterified epoxy polyester resins are those described and claimed in the copending Greenlee application of even date Serial No. 519,274 entitled "Unsaturated Diester Acids." These compounds are the esters of one or more long-chain unsaturated acids and a bis-(hydroxyaryl)-substituted aliphatic acid. Such compositions may be prepared, for example, by reacting 2 mols of the acid chloride of linoleic acid with 1 mol of 4,4-bis-(4-hydroxyphenyl)-pentanoic acid.

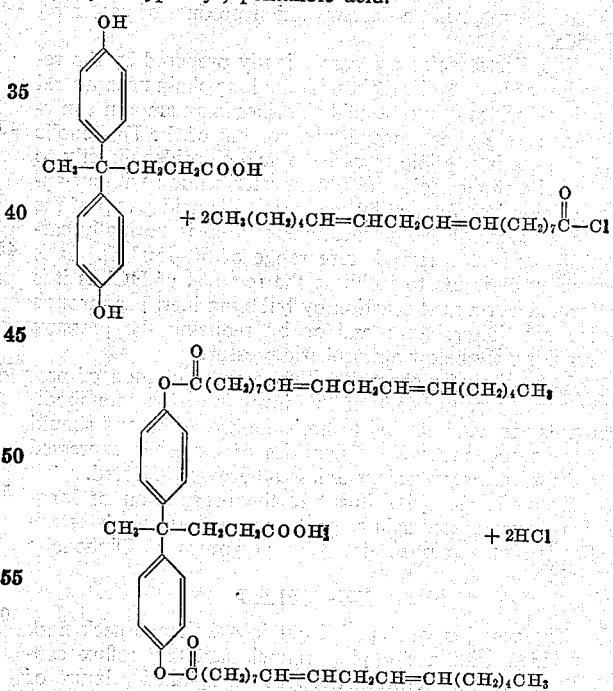

The aryloxy-substituted acid contemplated for use in preparing the desired unsaturated diester acid should have two hydroxyphenyl groups attached to a single carbon atom. The preparation of such an aryloxy acid is most conveniently carried out by condensing a keto-acid with the desired phenol. Experience in the preparation of bis-phenol and related compounds indicates that the carbonyl group of the keto-acid must be located next to a terminal carbon atom in order to obtain satisfactory yields. Prior applications, Serial Nos. 464,607 and 489,300, filed October 25, 1954, and February 18, 1955, respectively, disclose a number of illustrative compounds suitable for use as the aryloxy-substituted acid and methods of preparing the same. These materials, which are referred to for convenience as Diphenolic Acid, or DPA, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups having up to 5 carbon atoms as disclosed in Serial No. 489,300 or they may be halogenated.

The long-chain acids which are contemplated for use in preparing the synthetic esters of this invention include the unsaturated mono-carboxylic acids of at least about 10 carbon atoms and mixtures thereof. Illustrative of such acids are the drying oil fatty acids which normally contain from 18 to 22 carbon atoms, such as acids obtained by the saponification of naturally-occurring unsaturated vegetable oils including China-wood oil, oiticica oil, linseed oil, soyabean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by other synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material, a decomposition product of castor oil acids.

The diester acids are conveniently prepared by the reaction of Diphenolic Acid with the long-chain unsaturated acid chlorides using the acid chlorides in an amount equivalent ot the phenolic hydroxyl content of the Diphenolic Acid. It is possible to add the acid chlorides directly to the Diphenolic Acid and obtain esterification without appreciable interference by the carboxylic acid group of the DPA itself. The esterification reaction is normally carried out in the temperature range of 50–150° C. It is usually desirable to facilitate the removal of HCl as it is formed during the reaction by bubbling inert gas through the reaction mixture and/or by reducing the pressure considerably below atmospheric pressure.

The following examples illustrate the method of preparing the compounds of this invention. These embodiments are not intended to limit the invention, and should not be so construed. Quantities of materials expressed refer to parts by weight unless otherwise indicated.

Examples I to III illustrate the preparation of long-chain unsaturated acid chlorides of the type used in esterification of the phenolic hydroxyl groups of Diphenolic Acid.

EXAMPLE I

The reaction was carried out in a 2-liter, 3-neck flask provided with a dropping funnel, agitator, reflux condenser, and a thermometer. To an agitated mixture of 560 parts of soya fatty acids and 200 parts of benzene was added through the dropping funnel over a period of 2 hours 286 parts of thionyl chloride, holding the temperature during addition in the range of 60–65° C. The temperature was maintained at 65–80° C. for an additional 2½ hours, followed by removal of the benzene and excess thionyl chloride under reduced pressure. After removal of the benzene and unreacted thionyl chloride, the corresponding acid chloride was finally purified by vacuum distillation at 3 mm. pressure.

EXAMPLE II

In a procedure identical to that used in Example I, linseed oil acids were converted to the corresponding acid chlorides employing the same quantities of reactants. The purification in this case, however, consisted of removing the relatively volatile materials including the benzene and the unreacted thionyl chloride without purification of the acid chlroides by vacuum distillation.

EXAMPLE III

The procedure followed in Example I was repeated except that a like amount of the dehydrated castor oil acids was substituted for the soya fatty acids for conversion of the acid chlorides. These chlorides were purified by vacuum distillation as in Example I.

Examples IV to VI inclusive illustrate the preparation of unsaturated diester acids.

EXAMPLE IV

The preparation was carried out in a 3-neck flask provided with a mechanical agitator, a thermometer, and a condenser attached to an exhaust system. A mixture of 71.5 parts of 4,4-bis(4-hydroxyphenyl)-pentanoic acid and 136 parts of the acid chloride of soya bean oil acid from Example I was heated with agitation a 70–85° C. for a period of 3 hours, after which the temperature was gradually increased to 136° C. over a period of 2 hours and maintained at this temperature for an additional 2 hours. During the latter 4 hours of the reaction period this system was evacuated to a pressure of around 30–40 mm. by using a water aspirator, to facilitate removal of the HCl. The viscous liquid product had an acid value of 89, a hydroxyl value of 21, and a saponification value of 225. Saponification value as used herein is defined as the number of milligrams of KOH which are required to saponify the ester present in a one-gram sample. The hydroxyl value as used herein is the number of milligrams of KOH equivalent to the hydroxyl content in a one-gram sample of materials.

EXAMPLE V 75 parts of the viscous diester of linseed oil acid chlorides from Example II and 37½ parts of 4,4-bis(4-hydroxyphenyl)-pentanoic acid, were reacted according to the procedure of Example IV. The product had an acid value of 84, a saponification value of 222, and a hydroxyl value of 8.

EXAMPLE VI

A viscous diester acid prepared in the manner described in Example IV from 75 parts of the dehydrated castor oil acid chlorides of Example III and 37½ parts of 4,4-bis(4-hydroxyphenyl)-pentanoic acid had an acid value of 86, a saponification value of 218, and a hydroxyl value of 12.

The epoxidized polyester resins suitable for use in preparing the subject adducts are described in detail in the copending Greenlee application Serial No. 503,323, filed April 22, 1955. They are polymeric materials prepared by esterifying tetrahydrophthalic anhydride with a glycol, and containing up to about 15 monomeric units per molecule. Any one of a number of different epoxidized polyester resins are suitable for use herein, variations being dependent upon the extent of esterification and the glycol employed.

Complete esterification of the available epoxide and hydroxyl content of the epoxidized polyester resins may be effected by heating a mixture of 2 mols of the diester per epoxide equivalent weight of the former at 190–275° C. The reaction is carried out under conditions such that water is removed as it is formed by the esterification reaction. The removal of the water vapor is facilitated by bubbling inert gas through the reaction mixture or by removing the water by azeotropic distillation with a small amount of hydrocarbon solvents, such as mineral spirits or xylene.

Partial esterification of the epoxidized polyester resins may be accomplished by employing an amount of unsaturated diester acid equivalent to the epoxide content of the former, at temperatures of 100–200° C. Since this esterification reaction takes place at relatively low temperatures and in relatively short periods of time, it may be effected simultaneously with the conversion of the mixture, through its unsaturated portions, to the infusible, insoluble state. For example, a formulation to be used in a coating composition might be made up of a mixture of 1 mol of the diester acid and 1 epoxide equivalent weight of an epoxidized polyester resin, both dissolved in an organic solvent. By applying the composition in thin films and baking for 10 minutes to 2 hours, depending on the temperature, the esterification and conversion may be carried out in situ.

The following example illustrates the preparation of a typical epoxidized polyester resin of tetrahydrophthalic anhydride and 1,4-butanediol.

EXAMPLE VII

A. *Preparation of polyester from tetrahydrophthalic anhydride and 1,4-butanediol*

In a 3-neck flask provided with a thermometer, a mechanical agitator, and reflux condenser attached through a water trap was placed a mixture of 1.1 mols tetrahydrophthalic anhydride and 0.2 mol n-butanol. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at the esterification temperature. The reaction mixture was then heated with continuous agitation at 225–235° C. until the acid value decreased to 8.6. Acid value as herein described represents the number of milligrams of KOH equivalent to the acidity present in a one-gram sample. The product was a highly viscous, tacky solid having slight flow at room temperature.

B. *Epoxidation of the polyester resin of Part A*

In a 3-neck flask provided with a thermometer, a mechanical agitator, and a reflux condenser was placed 107 parts of the dehydrated acid form of a cation exchange resin (Dowex 50–X–8, 50–100 mesh, Dow Chemical Company) and 30 parts glacial acetic acid. The mixture of cation exchange resin and acetic acid was allowed to stand until the resin had completely taken up the acid. To this mixture was added 273 parts of the polyester resin of Part A dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 56.9. The percent nonvolatile of this solution amounting to 559 parts was 50. (The epoxide values as discussed herein were determined by refluxing for 30 minutes a 2-gram sample with 50 milliliters of pyridine hydrochloride in excess pyridine. [The pyridine hydrochloride solution was prepared by adding 20 milliliters of concentrated HCl to a liter of pyridine.] After cooling to room temperature, the sample is then back-titrated with standard alcoholic sodium hydroxide.)

The 559 parts of resin solution was thoroughly mixed with 175 parts of the dehydrated basic form of Dowex 1 (an amine type anion exchange resin). The resulting mixture was then filtered followed by pressing as much of the solution as possible from the anion exchange resin cake. This product had an acid value of 10.1 on the nonvolatile resin content. The epoxide equivalent was 304 on the nonvolatile resin content. The nonvolatile content was 45%.

Examples VIII to X illustrate the formulation of mixtures of the diester acids with the epoxidized polyester resins limiting the amount of acid to that equivalent to the epoxide content of the resin and their conversion to insoluble, infusible products.

EXAMPLE VIII

To a mixture of 20 parts of a 45% solution of the diester acid of Example IV in xylene mixed with 10 parts of the product of Example VII was added cobalt naphthenate paint drier in a quantity amounting to .03% of the nonvolatile content of the diester acid. Thin films of this varnish flowed on to tin panels and heat treated in an oven for 60 minutes at 175° C. gave conversion to a tack-free surface which was unaffected by exposure to boiling water for 9 hours, or by exposure to 5% aqueous NaOH for a period of 3 hours. Hard, tough, flexible films were also obtained by using a curing schedule of 10 minutes at 200° C.

EXAMPLE IX

The procedure followed in Example VIII was repeated except that the soyabean oil diester acid of Example IV was replaced by 20 parts of a 45% xylene solution of the linseed oil diester acid of Example V. This mixture resulted in films which on heat treatment for a period of 60 minutes at 175° C. were unaffected after 9 hours in boiling water or by exposure to 5% aqueous NaOH for a period of 10¼ hours. Tack-free surfaces were obtained on curing this composition for 15 minutes at 150° C.

EXAMPLE X

The procedure of Example VIII was repeated, using 20 parts of a 45% xylene solution of the dehydrated castor oil diester acid of Example VI. The resulting films, after heat treatment for 1 hour at 175° C., were unaffected after 9 hours in boiling water or exposure to 5% aqueous NaOH for 3 hours. Tack-free film conversion is obtained on heat treatment for 15 minutes at 150° C.

Examples XI and XII illustrate the preparation of varnishes by first esterifying the diester acids with the epoxidized polyester resins.

EXAMPLE XI

After removal of the volatile solvent from the epoxidized polyester resin of Example VII a mixture of 1 part of the epoxidized polyester resin and 2 parts of the diester acid of Example IV were gradually heated to a temperature of 200° C. with constant agitation and held at this temperature for 1 hour. The product was then dissolved in xylene to a nonvolatile content of 50% and treated with .015% cobalt naphthenate drier based on nonvolatile content. Thin films of this product flowed on to tin panels and heat treated for a period of 30 minutes at 175° C. gave hard, tough, flexible films.

EXAMPLE XII

After removing the volatile solvent from the product of Example VII, a mixture of 1 part of this epoxidized polyester resin and 3 parts of the product of Example V were heated with continuous agitation to a temperature of 200° C. and held at 200–225° C. for a period of 5 hours after which the product was dissolved in xylene to give a nonvolatile content of 50% and treated with .015% cobalt naphthenate drier (based on the nonvolatile content). A varnish was obtained which when spread in thin films gave tack-free surfaces after air-drying overnight or after heat treatment for a period of 15 minutes at 175° C.

It is to be understood that the above examples are intended to be illustrative only. They should not be construed as limiting the scope of the present invention since embodiments other than those specifically disclosed may be produced without departing from invention concept taught. It is desired, therefore, that only such limitations be imposed on the appended claims as are stated therein or required by the prior art.

What is claimed is:

1. A new composition of matter comprising the ester of (A) an epoxidized polyester of tetrahydrophthalic acid and a glycol, said polyester having an average of more than one epoxy group wherein the epoxy oxygen atom is linked to adjacent carbon atoms in the nucleus of said acid with (B) the diester of (a) at least one ethylenically unsaturated aliphatic monocarboxylic acid having at least about 10 carbon atoms and free of alcoholic hydroxyl groups with (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1-5 carbon atoms, the ester linkages of said ester of (A) with (B) being developed at least partially by the addition of the carboxyl group of diester (B) with the epoxy groups of the polyepoxy polyester (A).

2. A new composition comprising a condensation product of (A) an epoxidized polyester of tetrahydrophthalic acid and a glycol, said polyester having an average of more than one epoxy group wherein the epoxy oxygen atom is linked to adjacent carbon atoms in the nucleus of said acid and (B) the diester of (a) at least one ethylenically unsaturated aliphatic monocarboxylic acid having at least about 10 carbon atoms and free of alcoholic hydroxyl groups with (b) a pentanoic acid consisting essentially of 4,4 bis(4-hydroxyaryl)pentanoic acid wherein the hydroxyaryl radical is a hydroxyphenyl radical and is free from substituents other than alkyl groups of from 1-5 carbon atoms.

3. The composition of claim 2 where the pentanoic acid consists essentially of 4,4 bis(4-hydroxyaryl)pentanoic acid wherein the hydroxyaryl radical is a hydroxyphenyl radical and free from substituents other than alkyl groups of one carbon atom.

4. The composition of claim 2 wherein the pentanoic acid is 4,4 bis(4-hydroxyphenyl)pentanoic acid.

5. The composition of claim 4 wherein said acid (a) is vegetable oil fatty acids.

6. The composition of claim 4 wherein said acid (a) is fish oil fatty acids.

7. The composition of claim 4 wherein said acid (a) is oleic acid.

8. The composition of claim 4 wherein said acid (a) is linseed oil acids.

9. The composition of claim 4 wherein said acid (a) is dehydrated castor oil acids.

10. The composition of claim 4 wherein said acid (a) is soyabean oil acids.

References Cited in the file of this patent

"The Van Nostrand Chemist's Dictionary," pp. 367–8, D. Van Nostrand Co., Inc., N.Y., 1953. (Copy in S.L.)